June 30, 1970     J. BOSCO     3,517,836
CAR TOWER—AND MEANS FOR STORING AUTOMOBILES
IN A SPIRAL-SHAPED GARAGE
Filed June 27, 1968     6 Sheets-Sheet 3
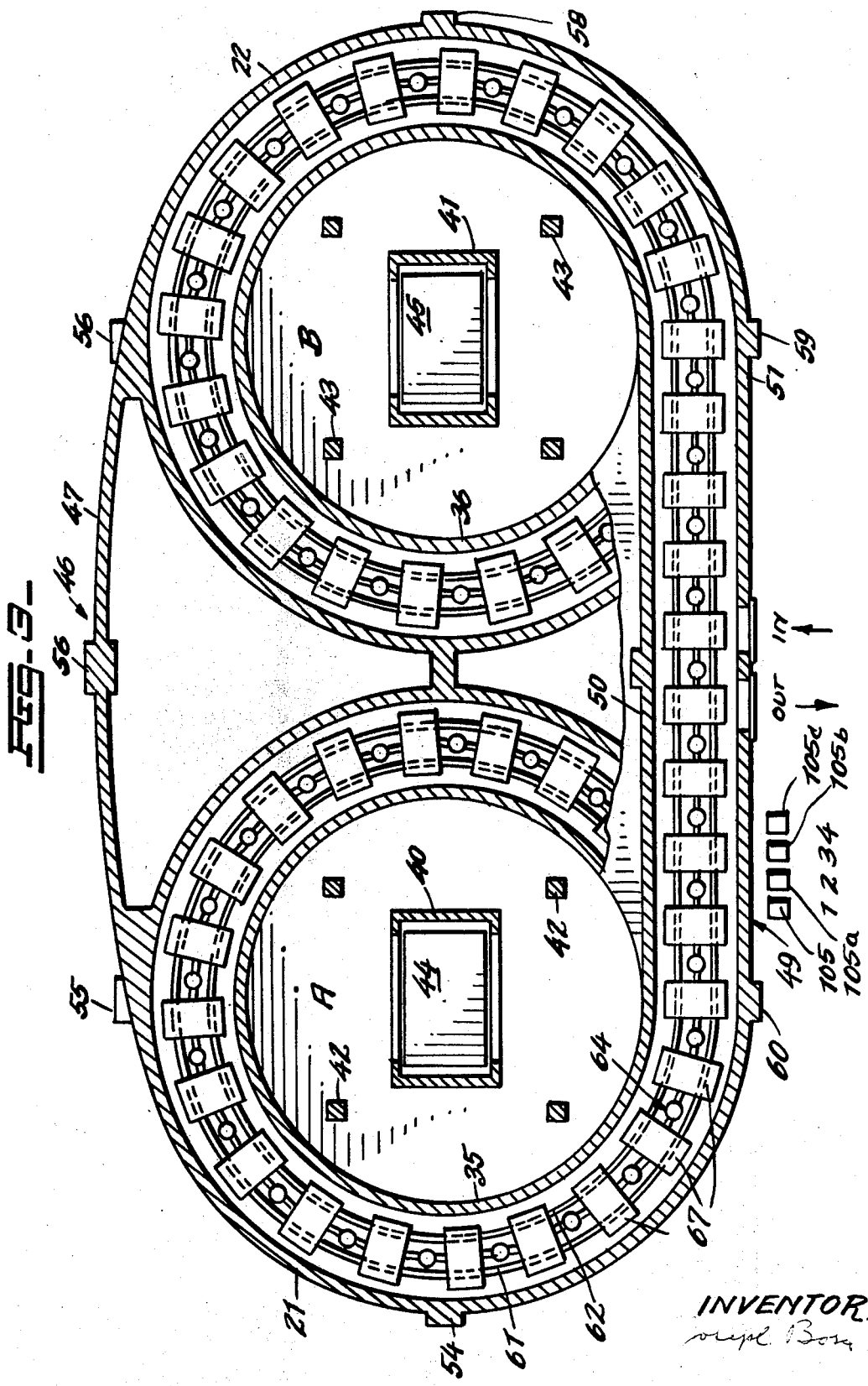
INVENTOR,
Joseph Bosco

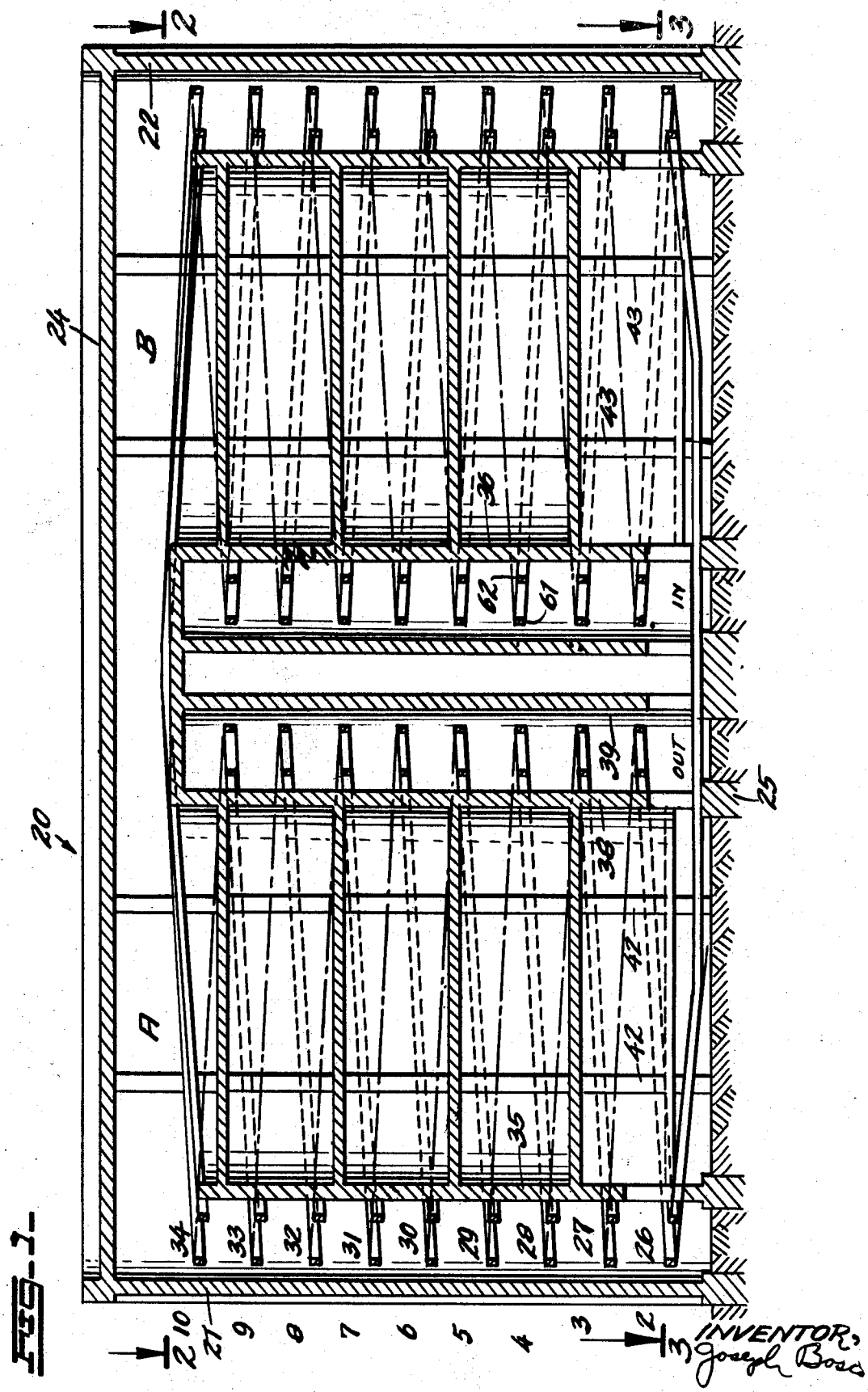

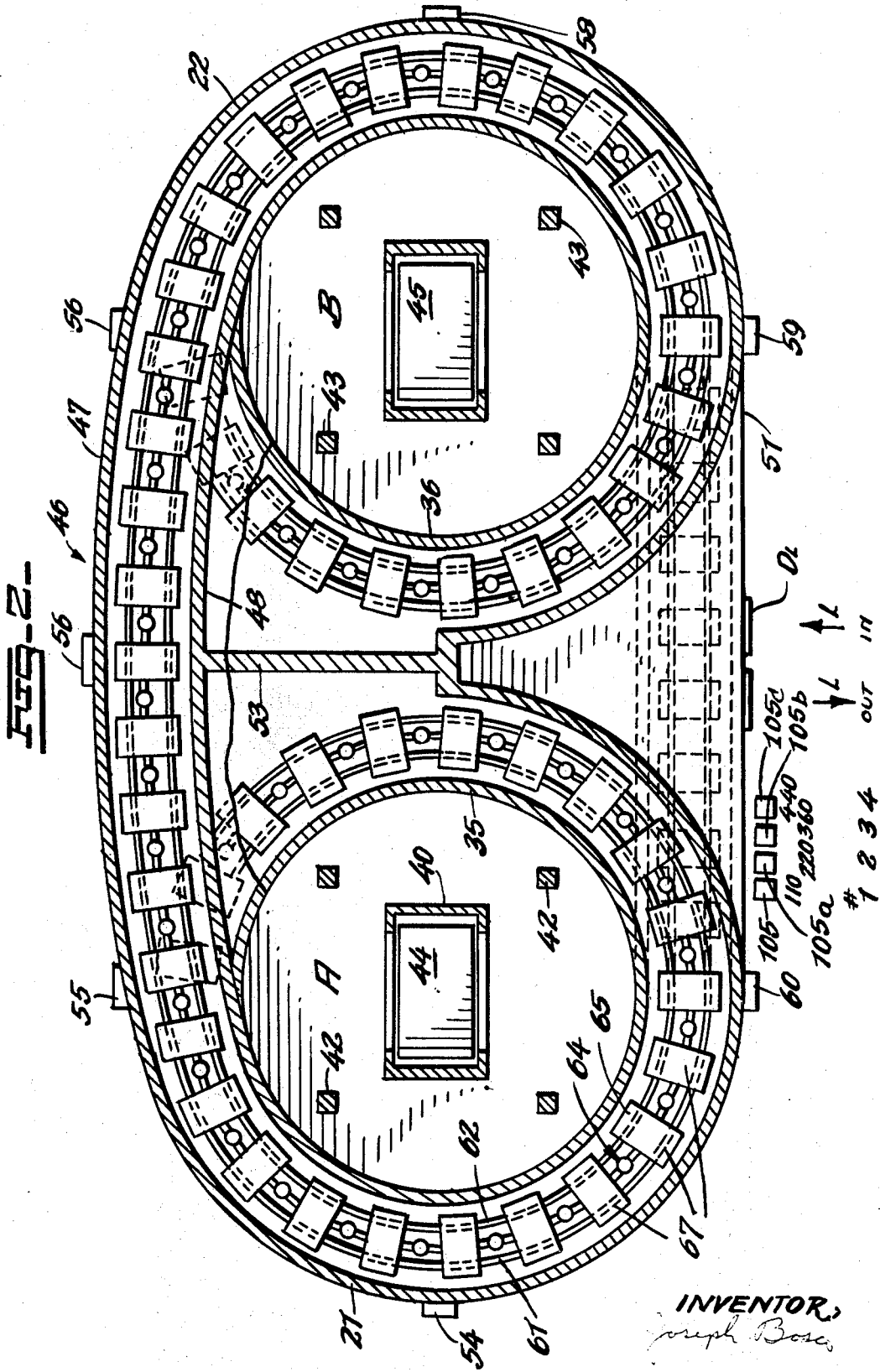

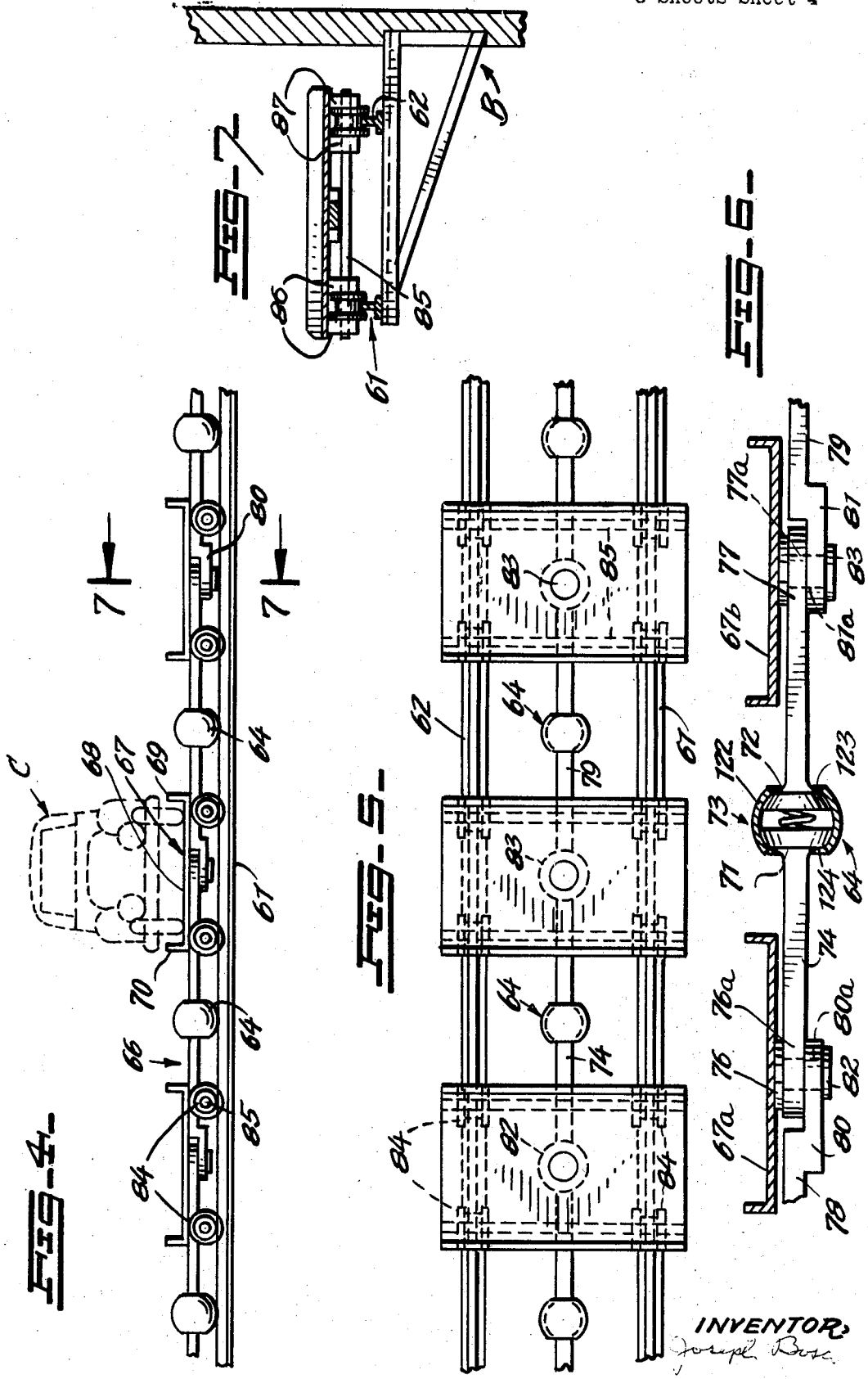

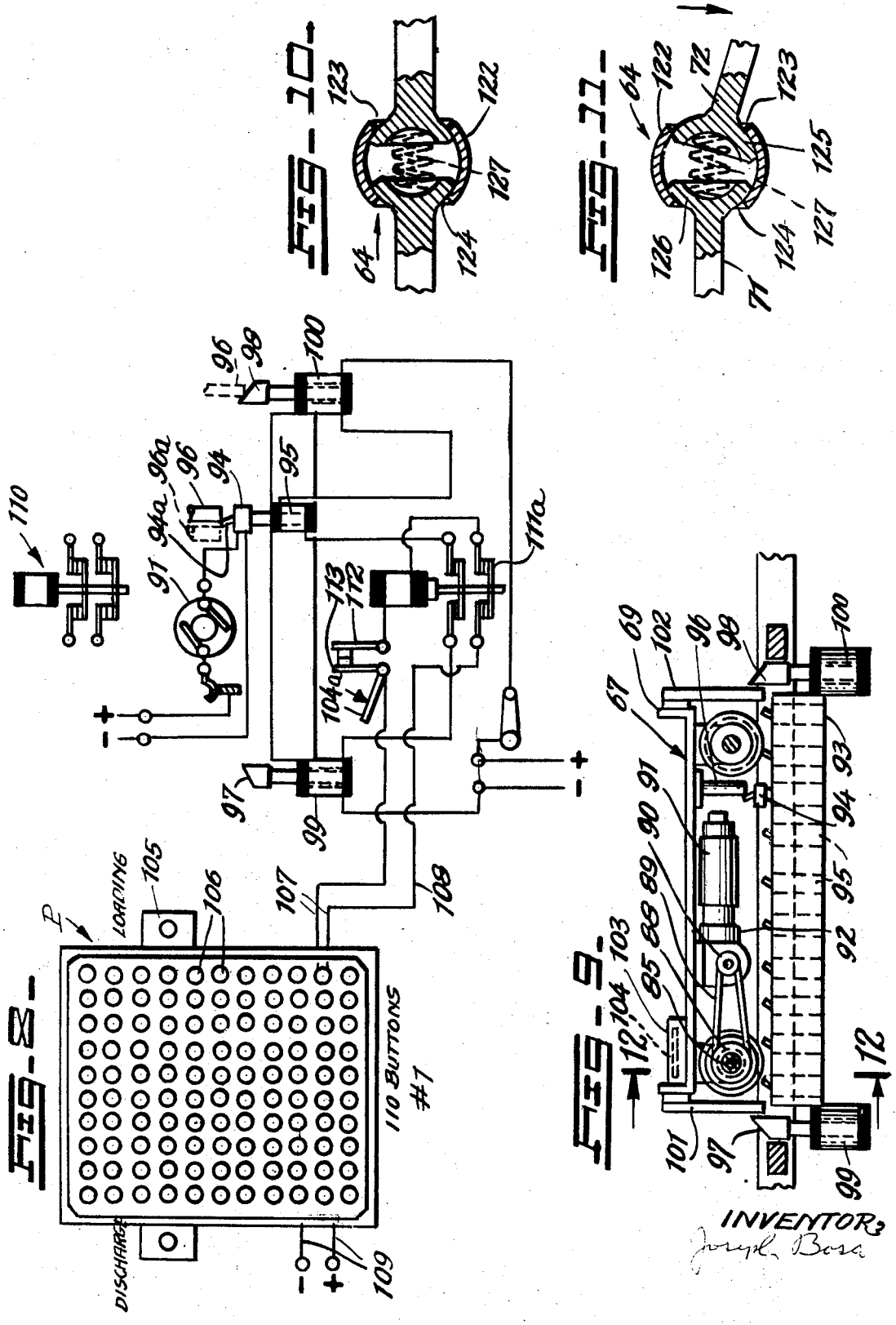

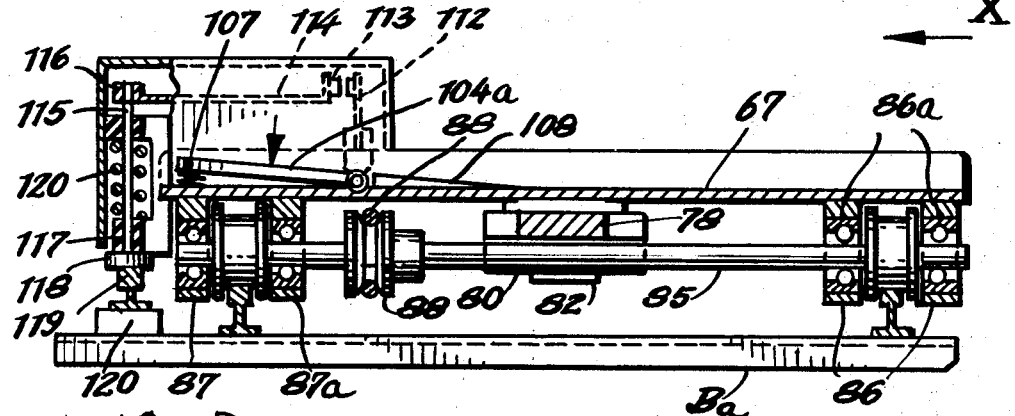
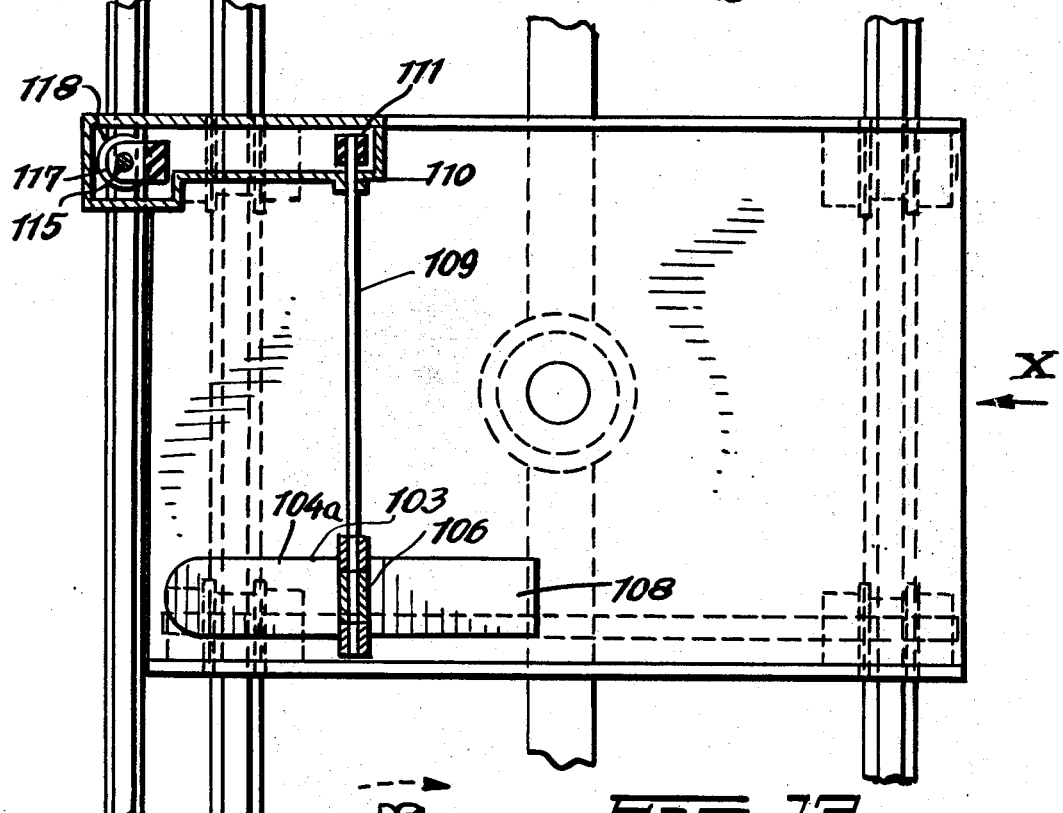
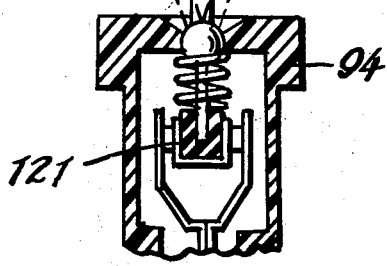

United States Patent Office 3,517,836
Patented June 30, 1970

3,517,836
CAR TOWER—AND MEANS FOR STORING AUTOMOBILES IN A SPIRAL-SHAPED GARAGE
Joseph Bosco, Everett, Mass., assignor to Eltop Corp., Orange, Calif., a corporation of California
Substituted for abandoned application Ser. No. 607,493, Jan. 5, 1967. This application June 27, 1968, Ser. No. 742,122
Int. Cl. E04h 6/06
U.S. Cl. 214—16.1
4 Claims

ABSTRACT OF THE DISCLOSURE

A parking garage comprising an endless chain system with support means thereon to support vehicles, the chain and support means are movably mounted in a twin tower structure with interconnecting corridors, control means are provided to selectively transport a preselected vehicle and/or vehicle support means to a predetermined exit and entrance position.

---

The present invention relates to car storage, and more particularly it relates to means for storing cars in a spiral-shaped or helical garage building. The primary object of the present invention being the storage of vehicles within a tower-shaped structure; hence such a storage means may be nick-named a "car tower."

Modern day development of the automobile industry, brought about innumerable problems of concern to the general public, and particularly in automobile parking vehicles. With each succeeding generation, the major dilemma of parking is worsened. Areas for parking become smaller and fewer daily, or insufficient, to accommodate the overflow of automobiles. With each family owning at least one automobile, parking is becoming a serious problem everywhere. Without doubt there is insufficient land in the urban areas for parking facilities. Even when there is land for parking available the widest areas are incapable of accommodating the many cars. Several acres can merely accommodate a few hundred cars at a time.

Consequently, the best solution to the irksome traffic and parking problem would be to go upwards. Accordingly, the main purpose of the present "car tower" invention is to provide a means for parking cars even in the most conjested areas. Especially in shopping centers, housing projects and in down-town sections of the city where the tower garage can be readily incorporated in the present office or department buildings. It is understood that the cost of erecting car towers will not be small. However, the initial investment will result in lasting improvements. It would be the best investment to a real problem. The deterring factor to business expansion and community development would thereby become solved. Facility of parking means in concentrated urban areas would present a new outlook and hope to a distressing situation.

Primarily my invention consists of two spiraling helical towers, of any height desired and of the appropriate diameter, correspondingly suited to building design and rules, for strength and security. Each tower would be provided throughout its entire circumferential outer wall with a spiraling ramp from bottom to top. The two adjacent towers are used for either the ascent or descent of the platform of cars as will be hereinafter described at greater detail.

The basic structure, meaning the immovable framework and understructure of the towers could be built of concrete, thus remaining a permanent structure. Or, preferably to fit to the more desirability of the over-all scope of the invention, it can be made up of sections of prefabricated materials, such as steel, aluminum or other of the modern toughened plastics. The material would, of course, be basically light but strong. These various sections would be assembled by interlocking methods and fasteners molded, built, or manufactured as part of the smaller units. These prefabricated sections could be constructed in such a manner so that when assembled they can in series make up either one, two, three or four, or for that matter, any other combination of car floors. The only variant would be the ground floor level and the top floor level which would have connecting extensions from one tower to the other, such as to form one continuous movement from tower to tower, such as to form one continuous spiraling ramp from left to right and right to left, for facile movement either way. The height of each level, at best would be about six to seven feet in height. The incline of the floors of the towers would be making a gradual incline to the next higher level. Of course, it goes without saying that these towers would be set and remain stationary. At the bottom and the extreme top the spiraling ramp would make a complete inverted turn, which although appears a reverse, it serves nevertheless for the continuity of movement for the same direction.

On, and over this base structure there would be a moving floor in the nature of a conveyor belt. It too would be made up by interlocking sections. This movable floor would be divided in sections, stalls, or platforms, on which would be set a car at right angles to the moving floor. A car is driven into its individual stall or section from a central opening and ramp on the ground floor of the two adjoining towers. Or separate entry and exit doors will be provided in such a manner as to permit loading cars from one opening and discharging cars from the other as not to interfere with the ingoing and outgoing traffic. The floor of each section or stall would have a slight groove on each side of the stall so that the tires of each car will set into this groove or curvature and thus remain stationary. Each stall, additionally, will be provided in the floor with a switch operated by a hinging arm or platform. The wheels of the car will ride over this platform to close the switch to energize the electric circuit operating the platforms.

Either the ltaeral sides, or center of the base structure would have at proper intervals large rotating gears. These gears would engage the movable floor laying over it with a corresponding gear engage the chain built on the underside of the floor. Or, the platforms of this function could be brought by means of cables to do the same operation similar to an elevator. Or, each car platform would have wheels riding over a pair of rail tracks mounted in the twin towers.

The conveyor belt or movable floor would be so timed and wired that by the mere pressing of a button the desired numbered stall or platform would be automatically stopped in front of the ground floor opening, for removal via the ramp, or for entering and storing a car through the same means. The same mechanism presently used in the automatic elevators of today could be used, if desirable. Although special automatic equipment may be used with good results. The movement would be in either direction, depending upon the operator of the mechanism, who would judge by the nearness of the particular numbered stall desired to the exit opening. Thus a two directional movement would be desirable. There would be a corresponding electrical board timed with the moving floor of the towers which would light up and show the position of the car stalls.

It is to be noted that the spiraling or helical circumference would hold many times the number of cars which the same ground floor area could hold most. The problem of space needed for entering or backing a designated area is by this invention entirely eliminated. In fact that very space can be used for storage purposes, or for department store purposes. Elevators will lead from the ground floor to the stores above. Such a structure can be envisaged by the new department store (Macy) erected in Queens, in New York City. The department store is perfectly round in circumference, several stories in height. Such a design structure could be readily adaptable for my car tower garage system here described.

Cars can be parked in each stall or platform of the system or section parallel to one another and with the maximum of closeness permissible by the over-all design of the system, for the need of opening doors (to permit the driver to step out of the parked car) is also eliminated. Much storage space is also gained by the fact that while the cars are spiraling upward the vertical space between the different floor levels are thereby also being utilized. All in all the corresponding number of cars that can be parked or stored by this means is manifold in comparison with present parking methods available.

My car-tower structure could be made entirely closed for winter protection or partially opened for areas where weather is of no consequence. Likewise my structures may be built underground. Or a section of my structures may be erected underground and another section above ground. Of course parking lot business could very well utilize this device and may thus multiply their earnings, even with the present rates. The advantage of course is evident. Every car is controlled from one exit by the mere pressing of a button and within minutes. Likewise, safety of the stored cars is also prevalent.

Accordingly, one object of the present invention is to provide a multi-story garage structure adaptable to receive a great number of cars parked in a helical fashion upon a moveable chain flooring.

A further object of the present invention is to provide in a storage building an endless chain means which may be provided with a plurality of individual and separate platforms or stalls upon which individual cars may be parked one after another in tandem.

Another object of the present invention is to provide upon said endless chain means for separate and independent coupling of one platform to another, and rail means upon which said platforms are moveably mounted.

Another object of the present invention is to provide said car platforms with wheels in contact with said rails, and motor electric means to drive the platforms upon said rails.

A further object of the present invention is to provide said individual platforms or stalls with brackets to arrest the movement of said endless chain mechanism preliminary to loading or discharging of cars.

Another object of the present invention is to provide a door in said structure for allowing the entry and exit of an automobile onto a platform upon said moveable chain.

An additional purpose of the present invention is to provide in said twin towers room for storage purposes, for department store and office space.

Another object of the present invention is to provide entry and exit doors into said garage structure, and elevator means to facilitate communication with the upper floors.

A further object of the present invention is to provide a structure formed of reinforced concrete which will be formed into a double helix connected by means of communicating corridors at each individual floor thereof.

Another object of the present invention is to provide a double helix-shaped structure connected by means of corridors at the upper and lower floors.

A further object of the present invention is to provide rail track communication means to support an endless chain and anchoring means to support said rail in said structure.

Another object of the present invention is to provide locking means to lock each stage of the chain preliminary to loading, and means to unlock said locking means when the automobile is fully loaded upon said platform.

Another object of the present invention is to provide electronic means for selectively locating the parked automobiles upon said stalls or platforms.

Another purpose of the present invention is to provide a number of panels which will contain a plurality of push-buttons, the operation upon said push-buttons helping to select the desired automobile parked in said chain mechanism.

Another object of the present invention is to provide a master switch for operating the circuitry of the selective mechanism aforesaid, and a stick circuit to lock the circuitry in its operative position upon depressing a push-button in said panel.

An additional object of said invention is to provide a switch in each car platform selectively operated by each automobile. The switch in question remaining open when a platform is free of a car load, and closed by the weight of the automobile over it.

Another object of the present invention is to provide a door in said structure for allowing the entry of automobiles and a switch being operable automatically by said door; preferably a light cell operable relay switch.

Another object of the present invention is to provide means to designate whether an automobile is parked in the left or the right section of the parking tower system. Such a switch may be electrically operable, or electromechanical in its structure.

A further object of the present invention is to provide individual relay switches and means for raising said relays so as to place them in the path of a moving platform or stall to be tripped or triggered by each individual platform as it passes over it.

A further object of said invention is to provide individual circuitry for each platform and means to integrate the circuits of all the platforms to a main electronic panel or board.

Another purpose of the present invention is to provide a coin operable fully automatic mechanism for loading automobiles in a car tower garage of the class described.

A further purpose of said invention is to provide a coin operable device to select the various automobiles in said chain system, and a time measuring device to measure parking time.

This invention also consists in certain other features of construction and the combination and arrangement of several parts to be hereinafter fully described, illustrated in the accompanying drawings and specifications, and specifically pointed out in the appended claims.

In describing the invention in detail, references will be had to the accompanying drawings where like character numerals denote like or corresponding parts throughout the several views in which:

FIG. 1 is a horizontal cross-sectional view through the parking system embodying the present invention. It shows the guiding rail tracks as they spiral from the ground to the upper floors of the twin garage structure and then return;

FIG. 2 is a sectional view taken on the line 2—2 of FIG. 1 showing the manner in which the endless car-chain is housed in the garage structure to move upon the guide rail track to the upper floors;

FIG. 3 is a sectional view taken on the line 3—3 of FIG. 1 showing the manner in which the endless car-chain is housed in the garage structure to move upon its guide rail track in the lower floors;

FIG. 4 is a detailed front elevational view of a section of chain and the manner in which the automobiles are being loaded upon it;

FIG. 5 is a top elevational view of FIG. 4 showing the manner of coupling the various sections of the car-chain to one another in tandem;

FIG. 6 is an enlarged detailed view of the coupling device;

FIG. 7 is a sectional view taken on the line 7—7 of FIG. 4 showing the manner in which the guide rails are being anchored in the building walls;

FIG. 8 shows the loading panel and the circuitry diagram for operating the car-chain and its loading platform in the car system;

FIG. 9 is a view through the operating and loading device for each individual loading platform;

FIG. 10 is a section through the coupling device in resting position;

FIG. 11 is a similar view showing the coupling device in its operative position;

FIG. 12 is an enlarged sectional view taken on the line 12—12 of FIG. 9 showing the details of the drive;

FIG. 13 is a plan elevational view of FIG. 12; and

FIG. 14 is a section through one of the toggle switches responsible for the operation of the drive mechanism.

It is to be understood that the present form of disclosure is merely for the purpose of illustration, and that there might be various modifications thereof, without departing from the spirit of the invention as herein set forth.

Referring now more particularly to the present invention, and more specifically to FIG. 1 which shows the best application of my car tower parking system, it comprises, in combination, the outer building or housing of the system designated by the index numeral 20; the vertical outer wall or shells 21 and 22, respectively; the roof 24 of the structure; the base of the building 25; the individual building floors, or floor sections designated by the index numerals 26 to 34, inclusive; the inner vertical walls of the structure designated by the numerals 35 and 36, respectively; the spiral or the helically mounted rails or tracks 38 and 39 (there is one pair of rails running parallel to one another forming the track); the elevator structures 40 and 41, inclusive; the group of floor supporting columns 42 and 43; and the electric elevators 44 and 45, inclusive, substantially as shown (at greater detail) in FIG. 2.

Reference now being made to FIG. 2 (which is a cross-section taken on the line 2—2 of FIG. 1), it can be discerned that the upright twin structures or car towers A and B, are so arranged as to stand adjoining one another in close proximity. Also it can be seen that the twin towers comprise, in fact, a pair of two vertical structures one formed within the other; the inner structure being of smaller diameter and the outer structure of larger diameter. The outer structures being designated by the index numerals 21 and 22, respectively; while the inner structures being designated by the numerals 35 and 36, respectively. Also it can be discerned that the twin towers A and B, are interconnected to one another by an arcuate corridor designated as 46 and being formed of a pair of vertical walls 47 and 48, respectively, running parallel to one another, and connecting one tower to the other, substantially as indicated in FIGS. 2 and 3.

Reference now being made to FIG. 2 again, it can be recognized that the connecting corridor 47 and the towers A and B form a figure of the numeral nine (9). A stiffening wall 53 may be provided dividing the tower structure A from B into two distinctly separate sections. Also stiffening columns 54 to 60, are provided upon the outer surface of the car tower garage, substantially as shown.

Within the vertical towers A and B, and its interconnecting corridor 46, there is mounted to move upon a double rail track 61 and 62, inclusive, the endless chain system 64. The latter may consist of a plurality of individual platforms or car stalls which may be mounted upon the chain system to move with it substantially as shown in FIGS. 2 and 3, inclusive. The chain 64 is designed in such a manner as to be flexible, permitting it to be bend freely when it rides around the circular towers A and B, and its interconnecting corridors 48 and 49, respectively. The chain construction will be described later at a greater detail.

Reference now being had to FIGS. 4, 5, 6 and 7, inclusive (which illustrate details of the chain system mechanism) and more particularly referring to FIG. 4, index numeral 66 indicates the chain system proper, comprised, in combination, by the car platforms or stalls 67 which are formed of the base or mounting plate 68, and a pair of vertical margins limiting stops 69 and 70, respectively. The latter are formed to prevent the car C from leaving the platform 67. It can be discerned that each platform or stall 67 may be held to an adjacent platform, in tandem, by means of the flexible coupling 64. The latter, in the main consists of the semi-spherical members 71 and 72 which are held within the spherical shell 73. It can be seen that the semi-spherical member 71 is provided with an arm extension 74 facing in one direction, while the semi-spherical member 72 is provided with an arm extension 75 facing in the opposite direction. The end sections of both arms or arm extensions 74 and 75 are formed into the hinging brackets 76 and 77, inclusive, with the latter being fitted with the centrally located hole or ball-bearing openings 76a and 77a, inclusive. From FIG. 6 it can be discerned that the arm extensions 78 and 79 (of the chain) are formed into the offset bracket members 80 and 81, which are similarly provided with centrally located ball-bearing openings 80a and 81a. The openings 79a and 80a are secured by means of the pin 82 to the underside of the platform 67a, while the ball-bearing openings 80a and 81a by means of the pin 83 are secured to the underside of the car platform 67b, substantially as indicated. By means of the flexible coupling 64 and the arms 74 and 75 a car platform or stall may be secured to another platform in such a manner as to permit easy flexing of the entire chain system as it is driven around the spiral circumference of the twin towers A and B, and in such a manner as to permit the loading and the unloading of automobiles with ease.

From FIG. 4 it can be seen that each platform or stall 67 is provided with four wheels (two pairs) 84 by means of which it can be driven upon the pair of tracks 61 and 62, inclusive (see FIG. 7). The wheels 84 are mounted on pairs of shafts 85, with the latter by means of the ball bearing brackets 86 and 87, respectively, being held under the platform 67. Reference being had to FIG. 9, it can be seen that one of the shafts 85 is being operable through the medium of the sprocket wheel 88, which is in mesh with the link chain 89 and is in turn being rotated by the sprocket wheel 90 which is driven through the medium of the synchronous electric motor 91. The latter is mounted under the platform 67 and operates the wheels 84 through the medium of the gear reduction or the speed reducer 92. By means of the synchronous electric motor 91 the car platform 67 is being driven upon the rail tracks 61 and 62, respectively, at an appropriate speed. It is not necessary to provide every car platform in the link chain system with an electric motor. Only every fifth platform has a motor. Yet when the link chain is driven, all of the synchronous motors in the system are being operated in unison. Inasmuch as the link chain runs upon an incline (from one tower to the other) little energy is required to drive the chain as the forces due to gravity (the total weight of the entire chain system plus the weight of all the cars upon it) are equalized. Only sufficient energy is required to overcome the friction in the ball bearings in which the shafts 85 rotate and the friction of the wheels upon the track rails.

Referring more particularly to FIG. 9 again (which shows the manner in which a car platform is restrained in its movement and is locked in position for the purpose of loading or discharging a car) it can be seen that directly under the platform 67 there is mounted the multiple switch block 93, which contains a plurality of individual toggle relay switches 94. The latter are mounted upon individual solenoid coils 95 and in such a manner as to be able to be raised into the path of the oncoming platform 67 when any one of the solenoids 95 is being energized. Each platform in its turn is provided with a finger detent 96 which extends below the platform 67, substantially as shown in FIG. 9. For each platform the detent 96 is located and mounted in a different relative position, under the platfrom 67. Also each detent is of substantially different length. Accordingly, when a solenoid coil 95 is energized (raising the toggle switch 94 into the path of the finger detent 96) only one of the detents mounted under any platform may contact that particular toggle switch. The toggle switch arm is normally in a neutral position shown in FIG. 14, with the circuitry in an operative position (closed). The operation upon the toggle switch arm 94 by the detent 96 in any direction (forward or in reverse) will open the switch and cut the flow of the electric current to the circuitry and to the synchronous electric motors 91 (which are mounted upon the platform 67) and thus discontinuing the electric current delivery to the motors and arresting the operation of the entire chain system.

When the synchronous electric motors 91 of the chain system are in an operative position and the entire chain system has been stopped, it is imperative that each individual car platform is locked securily in its proper loading and unloading position to enable it to receive or to discharge an automobile. To accomplish this task the switch box 93 (or the switch block under the platform 67) may be provided with several locking plungers which normally are depressed but can be moved into the path of the moving platform 67. Such locks may be comprised by the secondary finger detents 97 and 98, respectively, which are operable by means of the secondary solenoid coils 99 and 100. When the latter are being energized the detents 97 and 98 rise into the path of the platform 67 to contact the brackets 101 and 102 (held upon the uprights 69 and 70 in the platform 67). By means of the locks or the detents 97 and 98 it is possible to lock the platform 67 in its exact loading and unloading position at all times. The detents 97 and 98 remain raised until a car is fully loaded into the platform 67. The wheels of the car in the rear ride over the switch box 103 depressing the switch arm 104. To open the switch and to discontinue the flow of electric current to the secondary solenoids 99 and 100, thus permitting the detents 97 and 98 to return to their original inoperative position and thus release the platform 67 to be moved as desired.

Reference now being had to the circuitry diagram in FIG. 8, it shows one of the selective switch panels 105, which contains in all 110 push-buttons. Of course, the number of push-buttons in the panel varies depending upon the physical size of the car tower garage and the number of parked automobiles it contains. In this particular case (as illustrated in FIGS. 1, 2 and 3, inclusive) the car tower garage contains a total of 440 parked automobiles, arranged in the following manner. Each tower (there are two) has 10 stories, forming ten individual helical tracks, with each track supporting 21 automobiles, or 220 cars for the ten floors. The sum total of the cars in the twin towers is accordingly 420. To these must be added 20 additional automobiles which are parked in the interconnecting corridors 46 and 49, inclusive, giving a grand total of 440 cars. In as much as it would be totally impracticable to mount all the selective push-buttons (440 in all representing the total number of parked automobiles, or rather car platforms in the chain system) upon the panel, four individual panels are used instead, with each panel containing 110 selective push-buttons. Of course, it goes without saying that each push-button is marked with a number designating that particular automobile or car platform in the system. A light under the push-button (which is transparent) lights up when the button is depressed and remains lit as long as the button is locked in that position. It can be so arranged that the push-button remains locked in that position so long as the platform has not reached its designated stop position. Upon reaching the location so designated for loading (or reloading) the push-button automatically is released and the lamp under it goes off. The above referred to mechanism has not been shown in the present application, however, it can be readily envisaged as it is old to the art.

Depressing a particular push-button 106 in the panel 105 (there are four panels available numbered 105, 105a, 105b and 105c, see FIG. 2) closes a switch (not shown) which energizes a current flow to the main switch relay or box 93 (located under the platform 67). Each solenoid coil 95 in the box 93 is electrically connected by means of a pair of conduit wires 107 and 108 to the main current connection 109. The electric current pulse reaching a particular solenoid coil 95 (see FIG. 8) energizes the latter and lifts the toggle switch 97 to the position, substantially as shown in FIG. 8. The switch 94 is normally closed, permitting the flow of electric current to the motor 91 (or rather motors 91 because there are several synchronous motors mounted under each fifth platform 67 in the chain system, with one single motor for each platform). When a platform 67 (corresponding to the number of the push-button in the panel 105) reaches over the toggle switch 94, it contacts momentarily the toggle switch arm 94a, swinging it sideways (as it passes over it) to open the switch. This action cuts and discontinues the flow of electric current momentarily to the electric motors 91, and brings the chain system to a stop. Because of some momentum in the chain system inherent to its dynamic construction, the chain system does not stop immediately, but continues moving for a small interval. This action allows the detent 96 to pass over the toggle switch arm 94a and to clear same. This latter action permits the toggle switch to return to its original position, and to close the electric circuit to the synchronous motors. The motors 91 though do not become again energized because the current connections to their armatures had been cut through the medium of the stick circuit relay switch 110; the function of the latter to be described later at a greater detail. The secondary position of the detent 96 is indicated in FIG. 8, by the dotted lines 96a.

The secondary solenoid coils 99 and 100, inclusive, are operable through the medium of the toggle switch relay 94. When the switch 94 opens, the electric current to the motors 91, by way of the branch line is allowed to flow to the coils of the solenoids 99 and 100. The latter then become energized resulting in the raising of the secondary detents 97 and 98, inclusive, into the travel path of the platform 67. It can be seen that the detents 97 and 98 are positioned on either side of the bracket members 101 and 102 (see FIG. 9). It becomes apparent that the detents 97 and 98 are positioned on either side of the platform 67 to help lock the latter in its loading or unloading position, as already above described. It is, of course, understood that the secondary solenoid coils with their respective stop detents are operable in unison. In like manner, it must be understood that the solenoids 99 and 100 will remain energized through the medium of the secondary stick circuit relay switch 111 (see FIG. 8). By means of the secondary relay switch aforesaid it will be possible to continue the flow of the electric current to the solenoid coils, even though the original current pulse to the solenoids has been discontinued (when the toggle switch 96 was in its open position). The operation of the secondary stick circuit is similar to the one already described earlier and needs no further amplification.

It must be realized that the circuitry diagram shown in FIG. 8 is repeated for every one of the car platforms in the chain system. For 440 platforms, apparently, there must be available 440 such similar circuitry diagrams. They can be readily produced in a printed circuit fashion.

Each diagram may be operable independently of the other. Yet no two circuits may be operable at one time simultaneously. The manner of operating one circuit at a time is controllable by the push-button design, which is well known to the art. It is similar in overall construction to the push-button controls utilized in some radio and television sets. When one push-button is depressed, other buttons in the system rise to disconnect their respective circuits.

It is understood that the garage structure herein described may be provided with entry and exit openings to permit access and exit to and from said structure for the purpose of storage or office space. In as much as the center sections of the twin towers are provided with elevator service, it will be possible to utilize the room within the spiral track commercially and at a great profit to the entire system. Such circular department stores as the one recently being erected in Long Island City, N.Y., by Macy can be because of their circular configuration to accommodate both ample space for merchandising and for parking automobiles as well. The entry into the circular structure for department stores purposes will be possible through the side walls in the circular building, below the raised rail track, as it spirals from the ground story to the top story of the building (second story, see FIG. 1).

Referring more particularly to FIG. 12 (which is a section taken on the line 12—12 of FIG. 9), it can be discerned that the car platform or the stall 67 may be formed of a rectangularly shaped body, large enough to hold and to contain with ease the largest size passenger car. The car (not shown) enters the platform 67 longitudinally thereto and in the direction shown by the arrow X, and in such a manner as to permit the front wheel (not shown) of the automobile to pass over the lever of the foot pedal 104a of the switch box 104. Relative the operation and the design of the latter, the switch may contain a swiveling pedal 105 which by means of the hinge section 106, and the pair of the hinging members 107 and 108, respectively, is made fast to the upper section of the car platform, substantially as indicated in FIG. 9. The lever or the foot pedal 104a is raised above the platform (as indicated) and may be under the influence of the coil spring 107, which keeps it cocked. Also an inclined plate 18 is mounted adjacent to the foot pedal 104a to permit the car wheel (front) to ride over it and to rest against the foot pedal 104a as above described.

It can be seen that a shaft 109 may be secured to the hinge section 106 of the foot pedal. The opposite end of the shaft 109, at 110, may carry an upright switch arm 111. A contact switch 112 may be secured to the arm 111, facing a contact 113, which by means of the electrical connection 114 leads to the upright switch shaft 115, at 116.

The rail tracks 61 and 62, respectively, are held within the car tower by means of the cross arms or beams B, which are anchored into the walls of the structure (see FIG. 7), and in such a manner as to permit the rail track to form a spiral track in the building as already described. Paralleling the track 61–62 the electric rail 119 runs mounted upon the insulated spacers 120. The latter may be formed by a wooden track or separately mounted porcelain bushings. In a modification, it will be possible to mount the third rail directly upon one of the main rail tracks, properly insulated from the track by means of insulation.

The electric current supplied to the rail 119, by means of the switch 112–113 is fed into the electric motors 91 (when a car is loaded into the platform and the foot pedal is fully depressed). Also this action feeds the electric current to the push-button which has been selected upon the push-button panel, to light a lamp, to indicate by the light that this particular car stall has been occupied.

Reference now being had to FIG. 12 again, it can be seen that the foot pedal 118, of the switch 117, is under the influence of the coil spring 120, which serves to keep the foot plate 118 in a tight fit against the electric rail 119, substantially as indicated. The coil spring 120 permits and allows the switch shaft 117 sufficient vertical adjustment (up-and-down) when the car stall is driven around the curves in its ascent or descent in the spiral-shaped garage building.

The drive shaft 85 may be mounted under the car platform or stall 67 upon a pair of bearing brackets 86 and 87, respectively, which may be held fast to the car stall 67. Ball-bearings 86a and 87a, respectively, are held within the brackets 86 and 87. The shaft 85 can be held in the ball-bearings in question to turn freely, being driven by the belt pulley 88 and the endless belt 80; with the latter being driven by the electric synchronous motor 91, substantially as shown in FIG. 9. It is, of course, understood that other means of driving (the drive shaft 85) may be used as well (such as direct drive by gears, or through the medium of a link chain).

The toggle switch shown in section in FIG. 14, is designed in such a manner as to normally to be in closed or in "on" position (with the electric current supplied to the system). As the finger detent 96 (already described in FIG. 9) passes over the switch arm 94a, it swivels the latter in the direction shown by the arrow (solid lines). This action will "open" the switch contact 112 (solid lines) discontinuing the flow of current to the motor (or motors) 91, to stop the movement of the chain system in the predetermined position caused by the pressing of a particular pre-selected push-button upon the panel P (shown in FIG. 8). The toggle switch 94 may be formed in such a manner as the reverse travel of the finger detent 96 (in the opposite direction) to cause the trigger arm 94a to swivel in the opposite direction (dotted lines) to "open" the switch and to discontinue the flow of electric current to the synchronous motors 91. Accordingly, it becomes clear, that whichever way the toggle switch is being operable, it normally tends to remain open, and thus to discontinue the delivery of electric current to the drive motors 91. It is, of course, understood that this action (the cutting off of the electric current) occurs only momentarily. Thereafter with the finger detent 96 clearing the toggle arm 94a, the latter returns to its neutral position and the flow of the electric current to the motors 91 is restored. However, the momentary discontinuance of the electric current to the motors 91 also cut-off the delivery of the current to the stick circuit 111 (see FIG. 8). Because the coil of the stick circuit is under the influence of a tension spring, the non-delivery of the current permits it to snap open, thus breaking the established electrical connection to the main current and to the main switch 111a. The electrical connection with the main current will again be restored upon depressing another (numbered) push-button in the push-button panel P (see FIG. 8).

Referring in particular to FIGS. 10 and 11, inclusive, the latter indicate a cross section through the connecting coupling 64, by means of which one car stall is secured to an adjacent car stall in the chain system (shown in detail in FIGS. 5 and 6, inclusive). It is important to turn freely in the curves in the spiral path of the rail track. To this effect the coupling 64 may be formed of a substantially spherical-shaped outer shell 122, open at either ends 123 and 124, respectively, substantially as indicated. Each of the arms 71 and 72 (see FIG. 9) may be provided with a semi-spherical member 125 and 126, respectively, which snugly fits within the spherical member 122, and in such a fashion as to permit free swiveling of the latter. A coil spring 127 is housed within the hollow sections (formed behind the spherical members 125 and 126, respectively) to provide pressure and free relative movement between the two. It is, of course, understood that other forms of coupling may be provided as well. Although the manner shown in FIGS. 10 and 11, is deemed more preferable.

OPERATION

The following is a cursory description of the operation of my car tower system. Inasmuch as the object of the present invention is to reduce the storage space and to confine it to a much smaller area than permitted in an average type car garage, my invention provides for a two tower structure with interconnecting corridors to permit the utilization of a continuous chain system upon which individual platforms or stalls may be held. While the stalls or platforms shown in the drawings are indicated extending considerably a distance away from one another, for illustration purposes only, the present system (as shown and described) may actually accommodate a much greater number of car platforms. Their number from the estimated 440 can be readily increased to 600.

Of course, the larger number of parked cars will necessitate a greater number of push-buttons upon the panel system. Also it will take a little more time to deliver a car parked in the system. Although the chain system may be operable at comparatively high speed, there must be a limit to the speed which will vary with the size and the weight of the chain system and the number of automobiles parked in it. However, the present structure, by simply adding another two stories (from 10 to 12 stories) will be able to accommodate 100 automobiles. Accordingly a twenty (20) story building will accommodate 2000 cars with ease.

In loading an automobile into the parking system, the operator will search upon the selective panels for a push-button that is not lighted (those that are lighted indicate that those particular platforms or stalls are occupied by car loads). The selective push-button being depressed will connect the electric current source to the motors 91 to operate the entire chain system at once. The synchronous motors 91 will drive the chain system until the particular platform selected by the operator has reached the loading door (indicated in FIG. 2 by the letter L). The door marked D1 will then open automatically to permit the car to be driven into the platform. It need not be driven by its driver or the garage attendant. Simply, the automobile may be pushed into the stall by means of a loading gear (not shown) electrically, or pressure operated. Upon entering the stall the automobile will drive over the switch 103, depressing it, to energize a hydraulic cylinder (not shown) to close the door D1. With the door D1 now shut, a switch (not shown) is closed connecting the motors 91 to the main current source, but the chain system will remain immobilized notwithstanding. The light in the push-button will remain lighted and the push-button will remain depressed, indicating that the particular platform is loaded with an automobile.

When a new customer arrives desirous to load his automobile into the chain system, he selects another unlighted push-button in the push-button panels. The button being depressed revitalizes the chain system and permits the operation of the synchronous drive motors 91 again. Thus the above described operation is repeated all over again. In addition to the regular push-button 105, each panel contains at its right and left side a pair of buttons marked "load" and "discharge." When it is necessary to load an automobile into the chain system, the button marked "load" is depressed. In like manner to unload an automobile from the chain system, the button marked "discharge" is depressed by the operator.

A careful examination of the foregoing description in conjunction with the invention as illustrated in the drawings, will enable the reader to obtain a clear understanding and impression of the alleged features of merit and novelty, sufficient to clarify the construction of the invention as hereinafter claimed.

Minor changes in shape, size and materials, and rearrangement of parts, may be resorted to in actual practice, as long as no departure is made from the invention claimed.

Having described my invention, what I claim is the following:

1. A vehicle parking garage comprising: two vertical multi-story tower structure, a pair of corridors for interconnecting said tower structure, one corridor connecting said tower structure at the ground story level and another corridor interconnecting said tower structures at the uppermost story level, vehicle entry and exit means located at a selected level, a continuous spiral track located in each of said tower structure and interconnecting corridors thereby defining an endless track arrangement, an endless chain, said chain comprising separate link sections, means pivotally mounting said link section to each other for universal movement relative thereto, a plurality of wheeled vehicle support means connected to said endless chain for supporting vehicles thereon, the wheels of said vehicle support means being engaged with and guided by said spiral track, drive means mounted on selected ones of said vehicle support means to drive the wheels thereof along said spiral track, each of said vehicle support means having a depending finger, each of said fingers being located in a different position relative to the vehicle support means, control means for said drive means to transport a selected vehicle support means to the vehicle entry and/or exit means, said control means including a stationary switch box having a plurality of vertically movable independently operated toggle switches, a toggle switch being provided for each port means to allow selective contact between said toggle switches into the path of movement of said vehicle support means to allow selective contact between said toggle switch and said depending finger to deactivate said drive means, means for locking said vehicle support means at said entry and exit means, said control means including a stick circuit, said stick circuit being connected to said locking means and said means for raising said toggle switches to extend the operation period of said last named means to thereby actuate said locking means.

2. The structure as set forth in claim 1; and a foot pedal in each of said wheeled vehicles, a floor section in said wheeled vehicle upon which said foot pedal is hingeably mounted, an electric circuit included and comprising an off-and-on switch and a motor to operate said wheeled vehicle, said off-and-on switch operable through the medium of the hinged foot pedal and remaining normally open, the front wheels of a car stored in said wheeled vehicle passing over said hinged foot pedal to close said off-and-on switch, said switch remaining closed for the duration said car is parked in said wheeled vehicle, the removal of said car from said vehicle clearing said hinged pedal by the front wheels to open said off-and-on switch to discontinue the delivery of current to said stick circuit to stop the operation of the aforesaid motor.

3. The structure as set forth in claim 1; and vertical retainers provided to hold the wheeled vehicle in stationary position over said toggle switch, said retainers comprising a plurality of solenoid coils having movable armatures, said armatures being normally energized and movable to extend beyond the solenoid coils, a plurality of finger detents in said wheeled vehicle and mounted to extend below said vehicle to contact said raised armatures, to depress said armatures and to pass over said armatures, however, permitting said armatures to snap back by virtue of the magnetic force generated in said solenoid coils, to lock said vehicle in between said raised armatures, the operation upon said foot pedal by the car parked in said wheeled vehicle, when leaving said vehicle, opening said off-and-on switch to discontinue the electrical supply to said solenoid coils to lower said armatures so as to permit the wheeled vehicle to pass and to clear said armatures.

4. The structure set forth in claim 1; and a contact switch in said wheeled vehicle comprising a shoe, a spring over said shoe, said shoe contacting an electric rail, said shoe connected electrically to said off-and-on switch to supply current to said stick circuit, said contact switch in permanent contact with said rail, as said wheeled vehicles upon said endless chain are driven by said motor.

References Cited

UNITED STATES PATENTS

| | | | |
|---|---|---|---|
| 2,715,970 | 8/1955 | Carr | 214—16.1 |
| 2,788,140 | 4/1957 | Becker | 214—16.1 |
| 3,399,789 | 9/1968 | Forst | 214—16.1 |
| 2,342,468 | 2/1944 | Hallwood. | |

FOREIGN PATENTS

| | | |
|---|---|---|
| 1,146,392 | 11/1957 | France. |
| 991,691 | 5/1965 | Great Britain. |

GERALD M. FORLENZA, Primary Examiner

R. B. JOHNSON, Assistant Examiner

U.S. Cl. X.R.

198—38, 136